(12) United States Patent
Gordon et al.

(10) Patent No.: US 9,390,028 B2
(45) Date of Patent: Jul. 12, 2016

(54) COORDINATION BETWEEN MEMORY-SAVING MECHANISMS IN COMPUTERS THAT RUN VIRTUAL MACHINES

(71) Applicant: Strato Scale Ltd., Herzlia (IL)

(72) Inventors: Abel Gordon, Haifa (IL); Muli Ben-Yehuda, Haifa (IL)

(73) Assignee: STRATO SCALE LTD., Herzlia (IL)

( * ) Notice: Subject to any disclaimer, the term of this patent is extended or adjusted under 35 U.S.C. 154(b) by 0 days.

(21) Appl. No.: 14/797,201

(22) Filed: Jul. 13, 2015

(65) Prior Publication Data

US 2016/0110291 A1   Apr. 21, 2016

Related U.S. Application Data

(60) Provisional application No. 62/065,688, filed on Oct. 19, 2014.

(51) Int. Cl.
*G06F 9/455* (2006.01)
*G06F 12/12* (2016.01)
*G06F 12/10* (2016.01)

(52) U.S. Cl.
CPC .......... *G06F 12/109* (2013.01); *G06F 9/45558* (2013.01); *G06F 12/126* (2013.01); *G06F 2009/45583* (2013.01); *G06F 2212/151* (2013.01); *G06F 2212/657* (2013.01)

(58) Field of Classification Search
CPC .................. G06F 9/45558; G06F 2009/45583; G06F 12/126; G06F 2212/151; G06F 2212/657
See application file for complete search history.

(56) References Cited

U.S. PATENT DOCUMENTS

| 6,148,377 | A  | 11/2000 | Carter et al. |
| 6,591,355 | B2 | 7/2003  | Schuster et al. |
| 6,823,429 | B1 | 11/2004 | Olnowich |
| 6,880,102 | B1 | 4/2005  | Bridge |
| 7,162,476 | B1 | 1/2007  | Belair et al. |
| 7,421,533 | B2 | 9/2008  | Zimmer et al. |
| 7,913,046 | B2 | 3/2011  | Kamay et al. |

(Continued)

FOREIGN PATENT DOCUMENTS

WO   2009033074 A2   3/2007

OTHER PUBLICATIONS

International Application # PCT/IB2015/052179 Search report dated Sep. 16, 2015.

(Continued)

*Primary Examiner* — Hal Schnee
(74) *Attorney, Agent, or Firm* — D.Kligler IP Services Ltd.

(57) ABSTRACT

A method includes running in a computer a hypervisor that allocates physical memory pages of the computer to a Virtual Machine (VM). A guest Operating System (OS), a virtual memory and a virtual storage device run in the VM. The guest OS maps the allocated physical memory pages to respective virtual memory pages, retains virtual memory pages that are frequently-accessed by the VM in the virtual memory, and swaps-out virtual memory pages that are rarely-accessed by the VM to the virtual storage. In the hypervisor, one or more of the physical memory pages allocated to the VM are selected, and the corresponding virtual memory pages preventing from being swapped-out by the guest OS, by marking the corresponding virtual memory pages in the guest OS as accessed thus causing the guest OS to regard the corresponding virtual memory pages as frequently-accessed.

17 Claims, 2 Drawing Sheets

(56) References Cited

U.S. PATENT DOCUMENTS

| | | |
|---|---|---|
| 8,082,400 B1 | 12/2011 | Chang et al. |
| 8,266,238 B2 | 9/2012 | Zimmer et al. |
| 8,352,940 B2 | 1/2013 | Pafumi et al. |
| 8,544,004 B2 | 9/2013 | Fultheim et al. |
| 8,782,003 B1 | 7/2014 | Patterson |
| 8,818,951 B1 | 8/2014 | Muntz et al. |
| 8,943,260 B2 | 1/2015 | Ben-Yehuda et al. |
| 9,183,035 B2 | 11/2015 | Bacher et al. |
| 2002/0143868 A1 | 10/2002 | Challenger et al. |
| 2003/0212869 A1 | 11/2003 | Burkey |
| 2004/0153615 A1 | 8/2004 | Koning et al. |
| 2006/0143389 A1 | 6/2006 | Kilian et al. |
| 2006/0248273 A1 | 11/2006 | Jernigan, IV et al. |
| 2008/0294696 A1 | 11/2008 | Frandzel |
| 2009/0204718 A1 | 8/2009 | Lawton et al. |
| 2009/0307435 A1 | 12/2009 | Nevarez et al. |
| 2009/0307462 A1* | 12/2009 | Fleming ............... G06F 12/126 711/206 |
| 2010/0077013 A1 | 3/2010 | Clements et al. |
| 2010/0211547 A1 | 8/2010 | Kamei et al. |
| 2010/0281208 A1 | 11/2010 | Yang |
| 2011/0055471 A1 | 3/2011 | Thatcher et al. |
| 2011/0066668 A1 | 3/2011 | Guarraci |
| 2011/0072234 A1 | 3/2011 | Chinya et al. |
| 2011/0271070 A1 | 11/2011 | Worthington et al. |
| 2012/0011504 A1 | 1/2012 | Ahmad et al. |
| 2012/0131259 A1 | 5/2012 | Baskakov et al. |
| 2012/0158709 A1 | 6/2012 | Gaonkar et al. |
| 2012/0192203 A1 | 7/2012 | Corry et al. |
| 2012/0210042 A1 | 8/2012 | Lim et al. |
| 2012/0233425 A1 | 9/2012 | Yueh |
| 2012/0272238 A1 | 10/2012 | Baron |
| 2012/0324181 A1* | 12/2012 | Garthwaite ......... G06F 12/1081 711/159 |
| 2013/0080408 A1 | 3/2013 | Cashman et al. |
| 2013/0212345 A1 | 8/2013 | Nakajima |
| 2013/0249925 A1 | 9/2013 | Ginzburg |
| 2013/0275705 A1 | 10/2013 | Schenfeld et al. |
| 2013/0326109 A1 | 12/2013 | Kivity |
| 2014/0115252 A1 | 4/2014 | Yu |
| 2014/0244952 A1 | 8/2014 | Raj et al. |
| 2014/0280664 A1 | 9/2014 | Sengupta et al. |
| 2015/0039838 A1* | 2/2015 | Tarasuk-Levin .... G06F 12/0862 711/137 |
| 2015/0089010 A1 | 3/2015 | Tsirkin et al. |
| 2015/0286414 A1 | 10/2015 | Gordon et al. |

OTHER PUBLICATIONS

U.S. Appl. No. 14/333,521Office Action dated Nov. 27, 2015.
U.S. Appl. No. 14/260,304 Office Action dated Dec. 10, 2015.
International Application # PCT/IB2015/057235 Search report dated Dec. 29, 2015.
U.S. Appl. No. 14/181,791 Office Action dated Feb. 12, 2016.
International Application PCT/IB2015/057658 Search Report dated Jan. 12, 2016.
International Application PCT/IB2015/058841 Search Report dated Feb. 28, 2016.
Amit et al., "VSWAPPER: A Memory Swapper for Virtualized Environments", Proceedings of the 19th International conference on Architectural Support for Programming Languages and Operating Systems (AISPLOS'14), pp. 349-366, Salt Lake City, USA, Mar. 1-4, 2014.
Gupta et al., "Difference Engine: Harnessing Memory Redundancy in Virtual Machines", 8th USENIX Symposium on Operating Systems Design and Implementation, pp. 309-322, year 2010.
Heo et al., "Memory overbooking and dynamic control of Xen virtual machines in consolidated environments", Proceedings of the 11th IFIP/IEE International Conference on Symposium on Integrated Network Management, pp. 530-637, year 2009.
Waldspurger., "Memory Resource Management in VMware ESX Server", Proceedings of the 5th Symposium on Operating Systems Design and Implementation, 14 pages, Dec. 9-11, 2002.
Wood et al., "Memory Buddies: Exploiting Page Sharing for Smart Colocation in Virtualized Data Centers", Proceedings of the 2009 ACM SIGPLAN/SIGOPS International Conference on Virtual Execution Environments, pp. 31-40, Washington, USA, Mar. 11-13, 2009.
Gordon et al., "Ginkgo: Automated, Application-Driven Memory Overcommitment for Cloud Computing", ASPLOS's RESoLVE workshop, 6 pages, year 2011.
Zhao et al., "Dynamic memory balancing for virtual machines", Proceedings of the 2009 ACM SIGPLAN/SIGOPS International Conference on Virtual Execution Environments pp. 21-30, Washington, USA, Mar. 11-13, 2009.
Hines et al., "Applications Know Best: Performance-Driven Memory Overcommit with Ginkgo", IEEE 3rd International Conference on Cloud Computing Technology and Science, pp. 130-137, Nov. 29-Dec. 1, 2011.
VMware Inc., "Understanding Memory Resource Management in VMware vSphere® 5.0", Technical Paper, 29 pages, year 2011.
Roussev, V., "Data Fingerprinting with Similarity Digests", Advances in Digital Forensics VI, Chapter 8, IFIP Advances in Information and Communication Technology, vol. 337, 20 pages, 2010.
Ben-Yehuda et al, U.S. Appl. No. 14/181,791, filed Feb. 17, 2014.
Ben-Yehuda et al, U.S. Appl. No. 14/260,304, filed Apr. 24, 2014.
Zivan, O., U.S. Appl. No. 14/333,521, filed Jul. 17, 2014.
Mitzenmacher et al., "The Power of Two Random Choices: Survey of Techniques and Results", Handbook of Randomized Computing, pp. 255-312, year 2000.
Hudzua et al., "Memory Aggregation for KVM", 41 pages, KVM forum, Nov. 2012.
VMware Virtualization, 8 pages, year 2014.
Hilland et al, RDMA Protocol Verbs Specification, version 1.0, 243 pages, Apr. 2003.
Recio et al, "Remote Direct Memory Access Protocol Specification," RFC 5040, Network Working Group ,57 pages, Oct. 2007.
Gordon et al, U.S. Appl. No. 14/543,920, filed Nov. 18, 2014.
Traeger, U.S. Appl. No. 14/538,848, filed Nov. 12, 2014.
Traeger, U.S. Appl. No. 14/672,466, filed Mar. 30, 2015.
International Application # PCT/IB2014/067327 Search report dated May 20, 2015.
International Application # PCT/IB2014/067328 Search report dated May 18, 2015.
International Application # PCT/IB20151050937 Search report dated Jun. 28, 2015.
International Application # PCT/IB2015/052177Search report dated Jul. 19, 2015.
Lazar et al., U.S. Appl. No. 14/594,188, filed Jan. 12, 2015.
U.S. Appl. No. 14/260,304 Office Action dated May 25, 2016.
International Application # PCT/IB2016/050396 Search Report dated Mar. 13, 2016.

* cited by examiner

COORDINATION BETWEEN MEMORY-SAVING MECHANISMS IN COMPUTERS THAT RUN VIRTUAL MACHINES

CROSS-REFERENCE TO RELATED APPLICATIONS

This application claims the benefit of U.S. Provisional Patent Application 62/065,688, filed Oct. 19, 2014, whose disclosure is incorporated herein by reference.

FIELD OF THE INVENTION

The present invention relates generally to computer memory management, and particularly to methods and systems for memory management in computers that run Virtual Machines (VMs).

BACKGROUND OF THE INVENTION

Computers that run Virtual Machines (VMs) employ various mechanisms for making efficient use of memory. Some commonly used mechanisms comprise, for example, deduplication, ballooning, host-swapping and guest-swapping. Some mechanisms are typically carried out by the computer hypervisor, whereas other mechanisms are typically carried out by the VM guest Operating System (OS).

SUMMARY OF THE INVENTION

An embodiment of the present invention that is described herein provides a method including running in a computer a hypervisor that allocates physical memory pages of the computer to a Virtual Machine (VM). A guest Operating System (OS), a virtual memory and a virtual storage device run in the VM. The guest OS maps the allocated physical memory pages to respective virtual memory pages, retains virtual memory pages that are frequently-accessed by the VM in the virtual memory, and swaps-out virtual memory pages that are rarely-accessed by the VM to the virtual storage. In the hypervisor, one or more of the physical memory pages allocated to the VM are selected, and the corresponding virtual memory pages preventing from being swapped-out by the guest OS, by marking the corresponding virtual memory pages in the guest OS as accessed thus causing the guest OS to regard the corresponding virtual memory pages as frequently-accessed.

In some embodiments, marking the virtual memory pages as accessed includes causing the guest OS to regard at least one virtual memory page as frequently-accessed even though the virtual memory page is rarely-accessed. In an embodiment, selecting the physical memory pages includes selecting at least one physical memory page that was deduplicated by the hypervisor. Additionally or alternatively, selecting the physical memory pages includes selecting at least one physical memory page that was swapped-out by the hypervisor from a physical memory of the computer to a physical non-volatile storage device of the computer.

In some embodiments, marking the virtual memory pages as accessed includes modifying, by the hypervisor, page-access information maintained by the guest OS. In alternative embodiments, marking the virtual memory pages as accessed includes reporting the selected physical memory pages to a driver running in the VM, and marking the virtual memory pages as accessed by the driver. Marking the virtual memory pages as accessed may include modifying, by the driver, page-access information maintained by the guest OS. Alternatively, marking the virtual memory pages as accessed may include accessing the virtual memory pages by the driver.

There is additionally provided, in accordance with an embodiment of the present invention, a computer including a physical memory and a Central Processing Unit (CPU). The CPU is configured to run a hypervisor that allocates physical memory pages of the physical memory to a Virtual Machine (VM), to run in the VM a guest Operating System (OS), a virtual memory and a virtual storage device, wherein the guest OS maps the allocated physical memory pages to respective virtual memory pages, retains virtual memory pages that are frequently-accessed by the VM in the virtual memory, and swaps-out virtual memory pages that are rarely-accessed by the VM to the virtual storage, to select by the hypervisor one or more of the physical memory pages allocated to the VM, and to prevent the corresponding virtual memory pages from being swapped-out by the guest OS, by marking the corresponding virtual memory pages in the guest OS as accessed thus causing the guest OS to regard the corresponding virtual memory pages as frequently-accessed.

There is also provided, in accordance with an embodiment of the present invention, a computer software product, the product including a tangible non-transitory computer-readable medium in which program instructions are stored, which instructions, when read by a Central Processing Unit (CPU) of a computer, cause the processor to run a hypervisor that allocates physical memory pages of a physical memory of the computer to a Virtual Machine (VM), to run in the VM a guest Operating System (OS), a virtual memory and a virtual storage device, wherein the guest OS maps the allocated physical memory pages to respective virtual memory pages, retains virtual memory pages that are frequently-accessed by the VM in the virtual memory, and swaps-out virtual memory pages that are rarely-accessed by the VM to the virtual storage, to select by the hypervisor one or more of the physical memory pages allocated to the VM, and to prevent the corresponding virtual memory pages from being swapped-out by the guest OS, by marking the corresponding virtual memory pages in the guest OS as accessed thus causing the guest OS to regard the corresponding virtual memory pages as frequently-accessed.

The present invention will be more fully understood from the following detailed description of the embodiments thereof, taken together with the drawings in which:

DETAILED DESCRIPTION OF EMBODIMENTS

Overview

Figure 1:
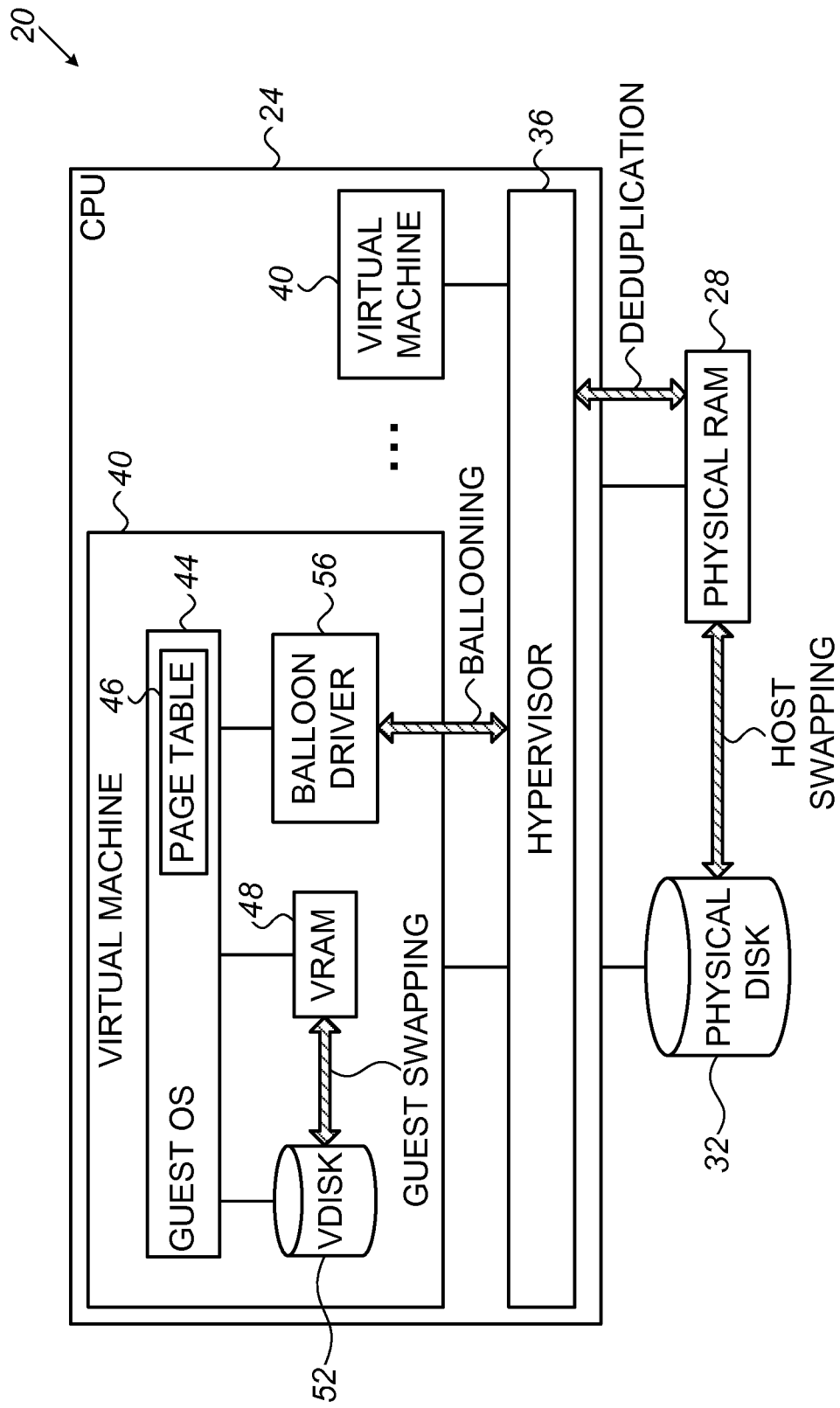
FIG. 1 is a block diagram that schematically illustrates a computer that runs Virtual Machines (VMs), in accordance with an embodiment of the present invention.

Embodiments of the present invention that are described herein provide improved methods and systems for making efficient use of a computer's memory resources. In some embodiments, a computer runs a hypervisor that allocates physical resources of the computer to one or more Virtual Machines (VMs). In particular, the hypervisor allocates physical memory pages of the computer's physical memory to a VM, and the VM maps the allocated physical memory pages to respective virtual memory pages (also referred to as guest pages or guest physical pages) in the VM's address space.

In general, both the computer's hypervisor and the VM's guest Operating System (OS) may deploy various mechanisms for saving memory. For example, the hypervisor may identify and deduplicate physical memory pages having identical content, and/or swap-out rarely-accessed physical memory pages to physical disk. The VM's guest OS may swap-out rarely-accessed virtual memory pages to its virtual disk. The VM may also "lend" memory pages to the hypervisor in a process referred to as ballooning.

Each of the memory-saving mechanisms described above is highly effective when deployed individually. When two or more of these mechanisms are deployed at the same time, however, they may conflict with one another. Such conflicts may degrade the net memory saving or degrade the overall performance of the system. Conflicts are likely to occur, for example, when the hypervisor and the guest OS apply memory-saving mechanisms to the same memory pages without coordination. In some embodiments of the present invention, the hypervisor avoids such conflicts by enforcing coordination between the memory-saving mechanisms deployed by the hypervisor and those deployed by the VM's guest OS without requiring modifications in the guest OS.

In some embodiments, the hypervisor selects one or more physical memory pages that were allocated to a VM, and decides that the corresponding virtual memory pages should not be swapped-out by the VM. The selected physical memory pages may comprise, for example, pages that were swapped-out or deduplicated by the hypervisor. The hypervisor causes the selected memory pages to be marked in the guest OS as frequently-accessed, regardless of their actual access frequency. As a result, the guest OS will typically refrain from swapping-out the memory pages in question.

The hypervisor may use various techniques to mark memory pages as "frequently accessed" in the guest OS. In some embodiments, the guest OS maintains a data structure referred to as a page table. Among other attributes, the page table holds a respective "access bit" that is used by the guest OS to classify each memory page allocated to the VM as "frequently accessed by the VM" or "rarely accessed by the VM." In an example embodiment, the hypervisor accesses the guest OS page table directly, and sets the access bits of the selected memory pages in a manner that causes the guest OS to regard these memory pages as "frequently accessed by the VM."

Alternatively, the hypervisor may communicate with a driver running in the guest OS, e.g., a ballooning driver, and notify the driver of the selected memory pages. The driver may in turn mark the memory pages in question as "accessed" in the page table, or simply access the memory pages so as to cause the guest OS to mark them as "accessed." In either case, this marking again causes the guest OS to regard the memory pages in question as "frequently accessed by the VM."

By enforcing coordination between the memory-saving mechanisms deployed by the hypervisor and the guest OS, the disclosed techniques prevent conflicts that degrade the net memory saving and performance. As a result, the computer may host a larger number of VMs, run larger and more complex VMs, and improve performance.

System Description

FIG. 1 is a block diagram that schematically illustrates a computer 20, in accordance with an embodiment of the present invention. Computer 20 may comprise, for example, a personal computer, a server in a data center or other computer cluster, or any other suitable computer.

In the embodiment of FIG. 1, computer 20 comprises a Central Processing Unit (CPU) 24, a volatile memory 28 and a non-volatile storage device 32. Volatile memory 28 is also referred to as Random Access Memory (RAM), physical RAM or physical memory, and non-volatile storage device 32 is also referred to as a physical disk. Computer 20 may also comprise other elements, such as a physical Network Interface Card (NIC) for connecting to a computer network.

CPU 24 runs a virtualization layer referred to as a hypervisor 36, which allocates physical resources of computer 20 to one or more Virtual Machines (VMs) 40. Physical resources may comprise, for example, CPU resources, volatile memory (e.g., physical RAM) resources, non-volatile storage (e.g., physical disk) resources and networking resources.

The internal VM structure is shown in FIG. 1 only for one of VMs 40, for the sake of clarity. Generally, however, the other VMs have similar internal structures. Typically, each VM 40 emulates a respective physical machine. In the present example, each VM 40 runs a virtual CPU (VCPU—not shown in the figure) that in turn runs a virtual operating system (OS) referred to as a guest OS 44. The VM further comprises a virtual RAM (VRAM) 48 that emulates a physical volatile memory, and a virtual disk (VDISK) 52 that emulates a physical non-volatile storage device.

In some embodiments, guest OS 44 maintains a page table 46 that holds information regarding physical memory pages that were assigned to the VM. The information may comprise, for example, a mapping from virtual addresses to physical addresses in the guest OS address space (Guest Virtual Addresses (GVA) to Guest Physical Addresses (GPA)). The pages in the VM address space are also referred to as Guest Frame Numbers (GFN).

In addition, page table 46 typically holds page-access information, i.e., information indicative of which of the allocated memory pages are accessed by the VM. In the present example the page-access information comprises a respective "access bit" that is set by the VCPU whenever the page is accessed, and is reset periodically by the guest OS. The access is bit thus indicative of whether the corresponding memory page is frequently-accessed or rarely-accessed by the VM. Alternatively, any other suitable type of page-access information may be used. Guest OS 44 may use any suitable techniques for defining and updating the page-access information of the various memory pages.

Guest OS 44 may also run a balloon driver 56, also referred to as a para-virtual driver, which is used for temporarily lending back to the hypervisor memory pages that have been allocated to the VM. The functions of driver 56 are addressed in greater detail below.

The configurations of computer 20 and VMs 40 shown in FIG. 1 are example configurations that are chosen purely for the sake of conceptual clarity. In alternative embodiments, any other suitable configurations can be used. RAM 28 may comprise any suitable number and types of volatile memory devices, such as one or more Dynamic RAM (DRAM) or Static RAM (SRAM) devices. Physical disk 32 may comprise any suitable number and types of non-volatile storage devices, such as one or more Solid State Disks (SSDs) or Hard Disk Drives (HDDs).

The disclosed techniques are typically implemented in software, but may also be implemented in hardware or using a combination of software and hardware elements. Typically, CPU 24 comprises one or more general-purpose processors, which are programmed in software to carry out the functions described herein. The software or components thereof (e.g., hypervisor, VM software, guest OS or other software components) may be downloaded to the processors in electronic form, over a network, for example, or it may, alternatively or additionally, be provided and/or stored on non-transitory tangible media, such as magnetic, optical, or electronic memory.

Example Memory-Saving Mechanisms

Hypervisor 36 and guest OS 44 may run various mechanisms for making efficient use of physical memory 28. Example memory-saving mechanisms, outlined below, are referred to as deduplication, ballooning, host-swapping and guest-swapping.

In a typical deduplication mechanism, hypervisor 36 identifies physical memory pages (in the hypervisor's physical address space) having identical content. Such duplicate memory pages may be identified both per VM and across different VMs. Upon identifying a group of duplicate pages, the hypervisor retains only a single instance of the content in RAM 28. The deduplicated page is write-protected. If a VM attempts to modify the content, the hypervisor performs copy-on-write.

In a typical ballooning process, hypervisor 36 communicates with balloon driver 56 in guest OS 44. Driver 56 is able to temporarily allocate memory pages, which were allocated to the VM, back to the hypervisor. If the hypervisor is in temporary shortage of memory, for example, it may request memory pages from ballooning driver 56. In response, driver 56 requests and receives memory page allocations from guest OS 44, using the guest OS memory management Application Programming Interface (API), and transfers the memory page addresses (e.g., GFNs) to the hypervisor. The hypervisor then unmaps the corresponding physical memory pages so they cannot be read or written by the guest OS, and may use these pages for any suitable purpose. The hypervisor returns memory pages to the VM by first mapping the physical memory to the guest-OS physical addresses that were previously allocated by the balloon driver. The balloon driver then de-allocates the corresponding page addresses (e.g., GFNs) using the guest OS memory management API. The pages are now again available for use by the guest OS.

In a typical host-swapping process, hypervisor 36 copies the content of one or more physical memory pages, which were allocated to one or more VMs 40, from physical RAM 28 to physical disk 32. The hypervisor then unmaps the guest pages so they cannot be read or written by the VMs. If a VM attempts to access a host-swapped memory page (whose content now resides on disk 32 and not in RAM 28), the VM VCPU will typically trap the hypervisor because the page was previously unmapped. In response, the hypervisor will load the page content from disk 32, place the content in a physical memory page in RAM 28, map the guest page again, and resume execution of the guest.

In a typical guest-swapping process, guest OS 44 copies the content of one or more rarely-accessed guest physical pages (virtual memory pages) from VRAM 48 to a guest-swap partition or file on VDISK 52 (emulated by the hypervisor). The guest OS can then use the swapped-out pages to store data that is frequently accessed by the VM. The guest OS unmaps the virtual addresses pointing to the guest physical pages. Thus, if these virtual addresses are accessed by some process in the VM, the guest OS can load the content back from VDISK 52 and map them back. The hypervisor is typically unaware of guest swapping and is usually not involved in this mechanism.

The four memory-saving mechanisms described above are depicted purely by way of example. In alternative embodiments, the hypervisor and/or guest OS may implement these mechanisms in other suitable ways, implement only a subset of these mechanisms, and/or implement any other suitable memory-saving mechanism.

Conflicts Between Memory-Saving Mechanisms

As noted above, memory-saving mechanisms may conflict with one another and cause performance degradation. Several non-limiting examples of potential conflicts are outlined below.

Conflict between deduplication and guest-swapping Consider a scenario in which hypervisor 36 decides to deduplicate three physical memory pages denoted VM1.GFN1, VM1.GFN2 and VM3.GFN1. VM1.GFN1 and VM1.GFN2 have been allocated to a VM denoted VM1, VM3.GFN1 has been allocated to a VM denoted VM3, and all three pages were found to have the same content. In this example, VM1.GFN1 is rarely accessed by VM1, and is therefore a good candidate for guest-swapping by the guest OS of VM1. VM1.GFN2 and/or VM3.GFN1, on the other hand, are frequently accessed by their respective VMs.

If guest OS 44 of VM1 decides to apply guest-swapping VM1.GFN1, it will copy the content of VM1.GFN1 to VDISK 52 of VM1, and use the page to hold other content. However, because VM1.GFN1 was actually deduplicated (in hypervisor 36) with VM1.GFN2 and VM3.GFN1, the new content will force a copy-on-write by the hypervisor.

The hypervisor will thus be forced to allocate a new physical memory page in RAM 28 for storing the new content of VM1.GFN1. The end result is an unnecessary waste of memory space in RAM 28, because the guest OS of VM1 is unaware of the fact that it has guest-swapped a memory page that was deduplicated by the hypervisor.

Conflict Between Deduplication and Ballooning

As noted above, hypervisor 36 is typically unaware of guest-swapping and is not involved in this mechanism. However, when the hypervisor uses ballooning it may indirectly cause the guest OS to perform guest-swapping. For example, when requested by hypervisor 36, balloon driver 56 will attempt to allocate pinned pages back to the hypervisor. If VRAM 48 does not contain a sufficient number of free memory pages to serve this request, the guest OS may decide to apply guest-swapping to rarely-accessed or cache memory. This sequence of events gives rise to the above-described conflict between deduplication and guest-swapping.

Conflict between host-swapping and guest-swapping Consider a scenario in which a page VM1.GFN1 is accessed rarely. Therefore, hypervisor 36 decides to apply host-swapping to this page, i.e., move its content from RAM 28 to disk 32. VM1 is unaware that this page was swapped-out by the hypervisor. Therefore, if memory pressure develops in VM1, the guest OS of VM1 may decide to apply guest-swapping to VM1.GFN1 (because it is rarely accessed).

In such a case, the guest OS will try to read VM1.GFN1 and store it in its swap partition/disk in VDISK 52. This attempt will force the hypervisor to load the content of VM1.GFN1 back from disk 32 into RAM 28, and then the guest OS will copy the content from VRAM 48 to VDISK 52. This problem, referred to as "double swapping," occurs because guest OS 44 is unaware of host-swapping by hypervisor 36.

In other cases, VM1.GFN may be actually used to cache data that is stored on disk, and the guest OS will not actually read the content because it can simply discard it. However, the guest OS will still overwrite the content (write to VM1.GFN) to store frequently-accessed data. Thus, the guest OS will still force the hypervisor to load VM1.GFN into RAM 28 while in fact the content of VM1.GFN can be discarded.

Conflict Between Host-Swapping and Ballooning

As noted above, the hypervisor is typically unaware of guest-swapping and is not involved in this mechanism. Nevertheless, when the hypervisor uses ballooning it may indirectly cause the guest OS to perform guest-swapping. For example, when requested, balloon driver 56 will try to allocate pinned pages back to the hypervisor. If VRAM does not contain a sufficient number of free memory pages to serve this request, the guest OS may decide to apply guest-swapping to rarely-accessed or cache memory. This sequence of events gives rise to the above-described conflict between host-swapping and guest-swapping.

The four example conflicts described above are depicted purely by way of example. Additionally or alternatively, various other conflicts may arise between memory-saving mechanisms, and various other such conflicts may be resolved or avoided by the disclosed techniques.

Coordination Between Memory-Saving Mechanisms

In some embodiments of the present invention, hypervisor 36 avoids conflicts between memory-saving mechanisms by enforcing coordination between the memory-saving mechanisms deployed by hypervisor 36 and those deployed by the VM's guest OS 44.

In some embodiments, hypervisor 36 selects one or more physical memory pages that were allocated to a certain VM 40, and decides that the corresponding virtual memory pages should not undergo guest-swapping by guest OS 44 of the VM. The selected physical memory pages may comprise, for example, pages that underwent host-swapping or deduplication by hypervisor 36. Hypervisor 36 causes the selected memory pages to be regarded by guest OS 44 as frequently-accessed, regardless of their actual access frequency. As a result, the guest OS will typically refrain from applying guest-swapping to the memory pages in question.

Figure 2:
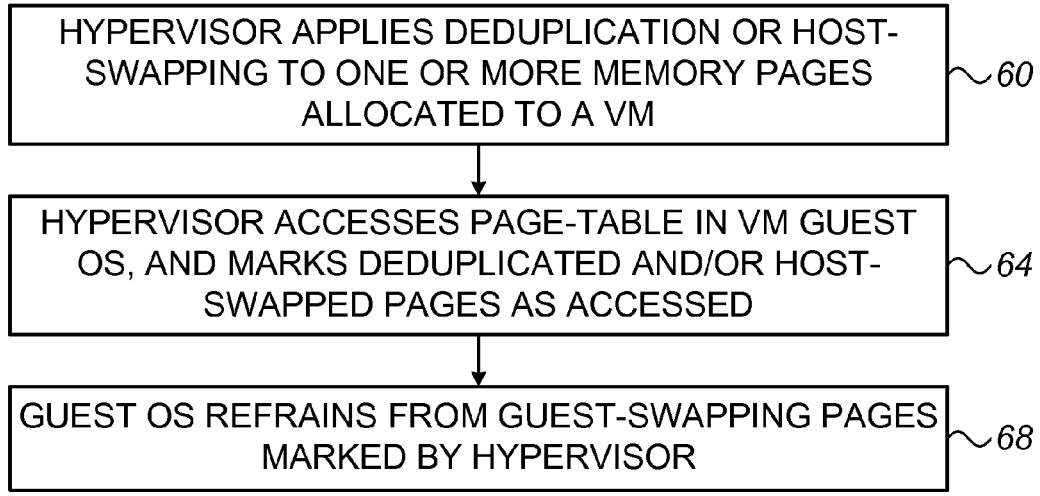
FIGS. 2 and 3 are flow charts that schematically illustrate methods for coordination between memory-saving mechanisms, in accordance with embodiments of the present invention.

FIG. 2 is a flow chart that schematically illustrates a method for coordination between memory-saving mechanisms, in accordance with an embodiment of the present invention. The method begins with hypervisor 36 of computer 20 applying deduplication or host-swapping to one or more memory pages that were allocated to a certain VM 40, at a host-side memory saving step 60.

At a page-table accessing step 64, hypervisor 36 accesses page-table 46 directly in the internal memory of guest OS 44. Hypervisor sets the access bits of the host-swapped and/or deduplicated memory pages to indicate "accessed." This setting is performed regardless of whether the memory pages in question are indeed frequently accessed or not. By marking memory pages as "accessed" in the page table, the hypervisor causes the guest OS to regard them as "frequently-accessed by the VM" even though they may not be. Thus, at least in some cases, the hypervisor causes the guest OS to regard a memory page as "frequently accessed by the VM" even though in reality the page is rarely accessed by the VM.

Hypervisor 36 may access page-table 46 directly, since the table is physically stored in memory pages in RAM 28 that were allocated to VM 40. The hypervisor may, for example, access a control register (e.g., CR3 in the x86 architecture) that points to the page tables. Since the page table maps virtual addresses to physical addresses, finding the appropriate page-table entries to modify may involve reverse-traversal of the table.

As a result of the hypervisor setting the access bits of the selected memory pages to "accessed," guest OS 44 typically refrains from applying guest-swapping to these memory pages, at a guest OS operation step 68.

Figure 3:
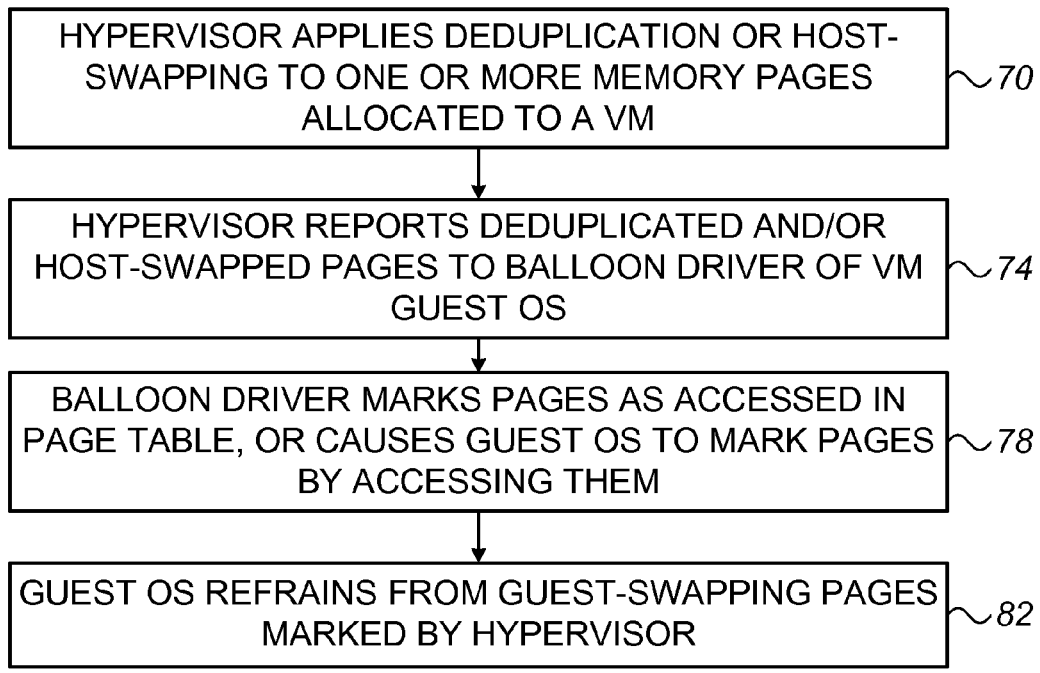

FIG. 3 is a flow chart that schematically illustrates a method for coordination between memory-saving mechanisms, in accordance with an alternative embodiment of the present invention. The method begins similarly to the method of FIG. 2, with hypervisor 36 applying deduplication or host-swapping to one or more memory pages that were allocated to a certain VM 40, at a host memory saving step 70.

In the present embodiment, however, the hypervisor does not access page-table 46 directly. Instead, at a reporting step 74, the hypervisor notifies balloon driver 56 of the host-swapped and/or deduplicated memory pages.

In response, balloon driver 56 marks the memory pages in question in the page table as "accessed," at a driver marking step 78. Alternatively, the balloon driver may access (e.g., read) the memory pages, which in turn causes the guest OS to mark them in the page-table as "accessed." As a result, guest OS 44 typically refrains from applying guest-swapping to the marked memory pages, at a guest operation step 82.

The examples above refer to a specific structure of page-table 46, purely by way of example. In alternative embodiments, the hypervisor may modify, or cause the guest OS to modify, any other suitable page-access information stored in the guest OS in any suitable way.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
running in a computer a hypervisor that allocates physical memory pages of the computer to a Virtual Machine (VM);
running in the VM a guest Operating System (OS), a virtual memory and a virtual storage device, wherein the guest OS maps the allocated physical memory pages to respective virtual memory pages, retains virtual memory pages that are frequently-accessed by the VM in the virtual memory, and swaps-out virtual memory pages that are rarely-accessed by the VM to the virtual storage; and
in the hypervisor, selecting one or more of the physical memory pages allocated to the VM, and preventing the corresponding virtual memory pages from being swapped-out by the guest OS, by marking the corresponding virtual memory pages in the guest OS as accessed thus causing the guest OS to regard the corresponding virtual memory pages as frequently-accessed.

2. The method according to claim 1, wherein marking the virtual memory pages as accessed comprises causing the guest OS to regard at least one virtual memory page as frequently-accessed even though the virtual memory page is rarely-accessed.

3. The method according to claim 1, wherein selecting the physical memory pages comprises selecting at least one physical memory page that was deduplicated by the hypervisor.

4. The method according to claim 1, wherein selecting the physical memory pages comprises selecting at least one physical memory page that was swapped-out by the hypervisor from a physical memory of the computer to a physical non-volatile storage device of the computer.

5. The method according to claim 1, wherein marking the virtual memory pages as accessed comprises modifying, by the hypervisor, page-access information maintained by the guest OS.

6. The method according to claim 1, wherein marking the virtual memory pages as accessed comprises reporting the selected physical memory pages to a driver running in the VM, and marking the virtual memory pages as accessed by the driver.

7. The method according to claim 6, wherein marking the virtual memory pages as accessed comprises modifying, by the driver, page-access information maintained by the guest OS.

8. The method according to claim 6, wherein marking the virtual memory pages as accessed comprises accessing the virtual memory pages by the driver.

9. A computer, comprising:
a physical memory; and
a Central Processing Unit (CPU), which is configured to run a hypervisor that allocates physical memory pages of the physical memory to a Virtual Machine (VM), to run in the VM a guest Operating System (OS), a virtual memory and a virtual storage device, wherein the guest OS maps the allocated physical memory pages to respective virtual memory pages, retains virtual memory pages that are frequently-accessed by the VM in the virtual memory, and swaps-out virtual memory pages that are rarely-accessed by the VM to the virtual storage, to select by the hypervisor one or more of the physical memory pages allocated to the VM, and to prevent the corresponding virtual memory pages from being swapped-out by the guest OS, by marking the corresponding virtual memory pages in the guest OS as accessed thus causing the guest OS to regard the corresponding virtual memory pages as frequently-accessed.

10. The computer according to claim 9, wherein the CPU is configured to cause the guest OS to regard at least one virtual memory page as frequently-accessed even though the virtual memory page is rarely-accessed.

11. The computer according to claim 9, wherein the CPU is configured to select the physical memory pages by selecting at least one physical memory page that was deduplicated by the hypervisor.

12. The computer according to claim 9, wherein the CPU is configured to select the physical memory pages by selecting at least one physical memory page that was swapped-out by the hypervisor from a physical memory of the computer to a physical non-volatile storage device of the computer.

13. The computer according to claim 9, wherein the CPU is configured to marking the virtual memory pages as accessed by modifying, by the hypervisor, page-access information maintained by the guest OS.

14. The computer according to claim 9, wherein the CPU is configured to mark the virtual memory pages as accessed by reporting the selected physical memory pages to a driver running in the VM, and marking the virtual memory pages as accessed by the driver.

15. The computer according to claim 14, wherein the CPU is configured to mark the virtual memory pages as accessed by modifying, by the driver, page-access information maintained by the guest OS.

16. The computer according to claim 14, wherein the CPU is configured to mark the virtual memory pages as accessed by accessing the virtual memory pages by the driver.

17. A computer software product, the product comprising a tangible non-transitory computer-readable medium in which program instructions are stored, which instructions, when read by a Central Processing Unit (CPU) of a computer, cause the processor to run a hypervisor that allocates physical memory pages of a physical memory of the computer to a Virtual Machine (VM), to run in the VM a guest Operating System (OS), a virtual memory and a virtual storage device, wherein the guest OS maps the allocated physical memory pages to respective virtual memory pages, retains virtual memory pages that are frequently-accessed by the VM in the virtual memory, and swaps-out virtual memory pages that are rarely-accessed by the VM to the virtual storage, to select by the hypervisor one or more of the physical memory pages allocated to the VM, and to prevent the corresponding virtual memory pages from being swapped-out by the guest OS, by marking the corresponding virtual memory pages in the guest OS as accessed thus causing the guest OS to regard the corresponding virtual memory pages as frequently-accessed.

* * * * *